Dec. 25, 1962

I. P. V. CARTER 3,070,707

MAGNETIC DRIVER DEVICE

Filed Oct. 10, 1958

2 Sheets-Sheet 1

INVENTOR
IVAN P. V. CARTER

BY William J. Schelberg
AGENT

Dec. 25, 1962 I. P. V. CARTER 3,070,707

MAGNETIC DRIVER DEVICE

Filed Oct. 10, 1958 2 Sheets-Sheet 2

3,070,707

MAGNETIC DRIVER DEVICE

Ivan Paul Venn Carter, Zurich, Switzerland, assignor to International Business Machines Corporation, New York, N.Y., a corporation of New York Filed Oct. 10, 1958, Ser. No. 766,490
Claims priority, application Switzerland Oct. 12, 1957
7 Claims. (Cl. 307—88)

This invention relates to a method for providing electrical current pulses in substantially inductive load resistances by means of the most complete possible switching of saturable magnetic core elements from one possible saturation state to the other.

In the course of the following considerations, the application of the method will, for sake of clearness, directly refer to the driving devices of electrical computing apparatus and such drivers will accordingly be explained as illustrative embodiments of the device of the invention. It is however, in no way contemplated to restrict to such devices the adaptability of the invention.

In electric computing apparatus aggregates which have the shape of annular magnetic cores and are arranged as a matrix are known, the characteristic of magnetic remanence of such aggregates being used for the storage of information. By means of an operative current pulse applied on windings located on magnetic cores, a positive or negative flux is induced in the cores and stored in the form of remanence. The states of magnetic remanence of the magnetic cores are frequently, in the field of computers, given the name of states "0" and "1" respectively. The current pulses resulting in these states are fed through the above mentioned drivers, which are inserted as passive elements between a source of input pulses and the windings acting as the load of said magnetic cores. Known drivers, which also utilize the remanence properties of magnetic cores in order to emit the output or driving pulses under the influence of the input pulses, have a restricted response speed, are subject to relatively heavy working losses and their output efficiency is moreover highly dependent upon the amplitude and shape of the incoming current pulse.

The waveform which it is desirable to obtain at the output of the driver is a rectangular pulse having a relatively fast decay time. For this purpose, use is made in known drivers, due to the heavily inductive load, through the storage matrix for instance, of a series resistance. This resistance however, consumes energy already in the course of the pulse duration, and it appeared that the working energy so consumed is by far higher than the energy out of phase in the preponderant inductive load.

One object of the invention is a method for providing current pulses in an inductive load, which enables to avoid the aforementioned drawbacks.

A further object of the invention is to provide a driver having a given output while consuming no appreciable energy.

A further object of the invention is to obtain in a magnetic core driver an automatic regulation of amplitude, i.e. a large independence between the current supplied by the driver and the current fed to the driver, which results in a large independence of the wave form of the latter.

To achieve the above objects, according to the method of the invention, the current equivalent of the flux change appearing in the load due to the switching of a first magnetic core element becomes transferred in the load resistance and, on the ensuing switching of a second magnetic core element, a counterpulse is produced which counterbalances the current flow in the load resistance.

To perform the above method, the device according to the invention includes at least two transformers provided with saturable cores, the cores of said transformers being independent from each other by means of primary windings and selectively switchable into one of the saturable states whereas their secondary windings are connected to the load.

Other objects of the invention will be pointed out in the following description and claims and illustrated in the accompanying drawings, which disclose, by way of example, the principle of the invention and the best mode, which has been contemplated, of applying that principle.

Figure 1:
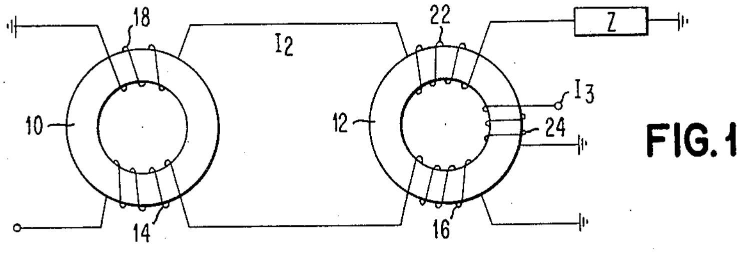
FIG. 1 is the wiring diagram of a device according to the invention, cooperating with an impedance and intended to act as a driver.

FIG. 1 is the wiring diagram of an illustrative embodiment of a driver according to the invention, provided with two core drivers. A driving cell includes a first core 10 and a second core 12. Each of said cores carries a primary winding, 14 and 16, respectively, as well as a secondary winding 18 and 22. The primary windings 14 and 16 of the cores 10 and 12 are series connected and connected to the circuit of a pulse generator (not shown). The secondary windings 18 and 22 of the cores 10 and 12 are also series connected and connected to a circuit of an impedance, Z. The impedance Z will be for instance a coordinate line of a magnetic core storage cell in a coordinate storage matrix. The core 12 additionally carries a further winding 24.

Figure 2:
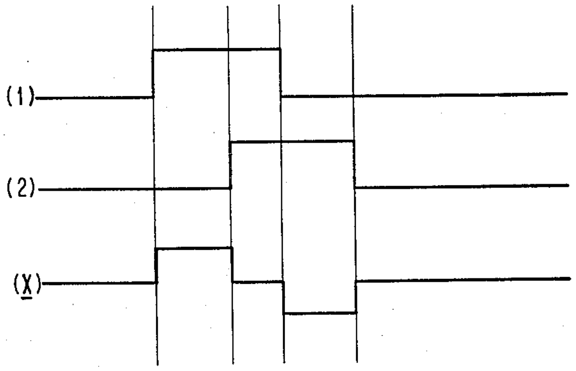
FIG. 2 shows the waveforms of individual output pulses obtainable with the device of FIG. 1 and the waveform resulting from the cooperation of the individual output pulses.

It is known that the purpose of a magnetic core driver in connection with a magnetic core storage cell in a coordinate storage matrix is to produce a rush of current the shape of which has a reference circuit $\underline{X}$ on FIG. 2, the amplitude, duration and risetime of which are determined by the properties of the storage cores, whereas the interval between the pulses and the cycle of the same depend on the system in which the storage device is to operate, and usually they must be kept as short as possible.

On the application of a current from a pulse generator (not shown), an initial current $I_1$ flows through the primary windings 14 and 16. According to the sense of direction of the primary winding 14, under the action of the initial current $I_1$ on the core 10, this core is switched towards positive. In turns out differently with the core 12, with regard to which the sense of direction of the primary winding 16 under the action of the initial current $I_1$ is so determined that said core is driven further towards the negative saturation.

On the switching of the core 10, a current $I_2$ is induced into the secondary winding 18 of this core, which current, through the secondary winding 22 of the core 12, reaches the impedance Z, in order to produce a corresponding pulse in said impedance. This pulse has been shown in FIG. 2 as a current 1 and results in the positive portion of the desired output wave of the driver shown by the waveform ($\underline{X}$). Under the action of the induction current $I_2$ the secondary winding 22 of the core 12 has a sense of direction which corresponds to the aforesaid sense of direction of the primary winding 14 under the action of the initial current $I_1$, or, in other words, the secondary winding 22 attempts to switch core 12 positive. This attempt of the secondary winding 22 is cancelled out due to the action, exerted in an opposite sense of direction by the primary winding 16 of the core 12 relatively to said winding 22, so that the core 12 is fact keeps on the initially prevailing negative flow, and even reinforced under certain conditions. The windings 14 and 16 may also be fed independently from each other. After a predetermined time has elapsed, the circuit of the winding 24 of the core 12 is then closed and a current $I_3$ flows in this winding. The sense of direction of the winding 24 under the action of the current $I_3$ is such that the core 12 is also switched to positive. Of course, the current $I_3$ must be chosen strong enough to achieve this purpose. The switching of the core 12 induces in the secondary winding 22 a current pulse, designated by a current 2 in FIG. 2, which opposes the induced current $I_2$ already flowing in the winding 22, this pulse being so chosen that the current flow in the impedance Z becomes reduced to zero on the switching of the core 12. Thus, the first portion of the output wave $(\overline{X})$ of FIG. 2, i.e. the positive pulse supplied by the driver to the load, is terminated and both cores are in the positive saturation state. A negative output wave, e.g. the negative portion of the waveform $(\overline{X})$ of FIG. 2, may be produced in an analogous way, if the core 10 is switched first, and subsequently the core 12, to the negative saturation state. In particular cases however, only a positive output pulse must be produced. In such a case, both currents $I_1$ and $I_3$ become cut off after the positive pulse has terminated in the abovementioned manner, and the cores, which then, as mentioned above, are in the positive saturation state, are reset to their initial condition. In order to induce a current in the secondary winding as small as possible, the cores 10 and 12 must be simultaneously reset and the number of turns of the windings of the core 10 and the core 12 should be equal. It should be noted that the windings 16 and 24 shown in FIG. 1 may be a single winding. It may be desirable, in order to maintain the currents $I_1$ and $I_2$ at a minimum, to depart from the above indications as to the choice of the number of turns on the second core 12, more particularly in the adjustment of the particular time interval within a cycle in the course of which the difference current has to be minimum, when considering the impedance ratios during the cycle. In a storage matrix the storage core may be switched during a pulse, but it may also remain in the state which it already occupies. Additionally, the second pulse may generally fail. It is obvious that, due to the combination of these possibilities, quite different difference currents exist, which require a careful matching of the number of turns on the core 12.

Figure 3:
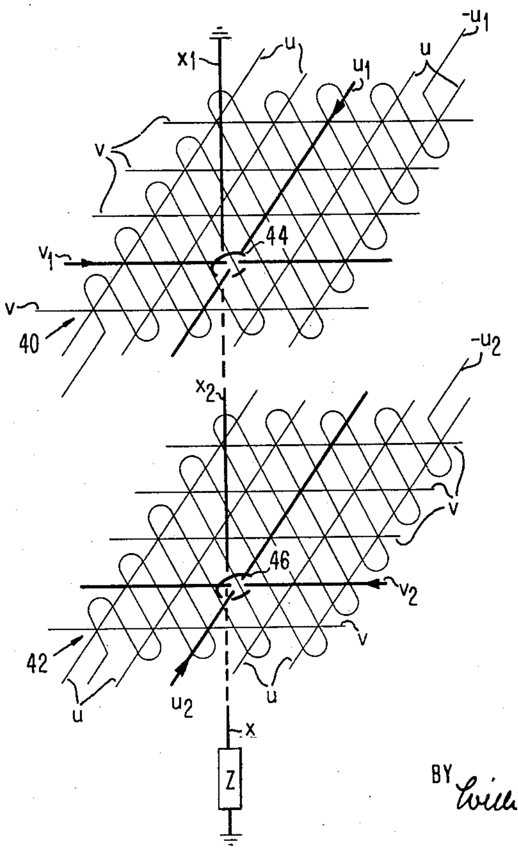
FIG. 3 is the wiring diagram of the device of the invention when used as a cell of a coordinate driving matrix.

The FIG. 3 shows an embodiment wherein the double core driver, according to the invention, is employed to drive a coordinate storage matrix. Two coordinate matrices 40 and 42 are provided for in a driving device adapted to operate according to this invention. In each matrix a run coordinate lead $v$ and a coordinate lead $u$ is provided. Annular magnetic cores are at times located in the area where the leads $v$ and $u$ intersect. For the sake of clarity, the FIG. 3 shows in each matrix a single such magnetic core 44 and 46 respectively, located at the intersection of coordinate leads, designated respectively, as $v_1$, $u_1$ and $v_2$, $u_2$. The cores 44 and 46 correspond to cores 10 and 12 of FIG. 1. The coordinate leads $v_1$ and $u_1$ may be considered as a part of the primary winding of the corresponding core. It is obvious that it may be desirable in practice to provide real windings on the cores, but the coordinate leads may merely be passed through the annular cores while exhibiting a sufficient interference in many cases of application. The winding 24 of the wiring diagram of FIG. 1 corresponds in the matrix 42 to a coordinate lead $u_2$ and a lead $v_2$, and the winding 16 corresponds to a winding $-u_2$, which runs through all the cores of the matrix 42. The secondary windings 18 and 22 of FIG. 1 correspond in FIG. 3 to secondary windings $x_1$ and $x_2$, which are operatively connected and, through a coordinate lead $x$, are also connected to a load $z$. It will be assumed that the load is a coordinate storage matrix. A pre-loading winding $-u_1$ is also inserted in the matrix 40 which runs through all the magnetic cores of the matrix. The use of such a pre-loading winding $-u_1$ in driving matrices is known per se, its purpose being occasionally to continously keep negatively biased the magnetic cores of a driving matrix. It will be pointed out here that the matrix 40 may also be constructed without including the pre-loading winding $-u_1$ (cf. for instance FIG. 1).

It will now be shown that, in cooperation with a coordinate storage matrix, the driver will produce a pulse, the shape of which is designated by $(\overline{X})$ in FIG. 2. In the embodiment description to follow, the mode of operation of the driving matrices of the invention illustrated in FIG. 3, reference will again be had to FIG. 2, which is now understood as the illustration of the output pulses of the individual matrices and of their cooperation. It will further be kept with the assumption that the whole cores of both matrices are negatively biased.

In the subsequent detailed description, the function of a driving cell comprised of the cores 44, 46 of the matrix 40 and 42 respectively, is considered and therefore and the associated coordinate leads $v_1$, $u_1$ and $v_2$, $u_2$ are shown in dark lines. The load, represented in FIG. 3 only as a storage cell Z, is acted upon by the driving cell 44—46.

In order to switch the annular core 44 and thus produce the first rush of current in the winding $x_1$ and in the sensing winding $x$, currents $(1)_v$ and $(1)_u$ having the same direction are sent through the coordinate leads $v_1$ and $u_1$ respectively. The other magnetic cores of the matrix 40 (not shown) through which the leads $u_1$ and $v_1$ run, are thereby subjected to the action of the currents $(1)_v$ and $(1)_u$ respectively. But these currents alone cannot produce the magnetomotive force necessary to switch a magnetic core because their amplitudes are so chosen that they do not reach the coercive force, or because they are not in a condition to individually overcome the action of a pre-load current existing in the winding $-u_1$. The non-selected cores remain in the negative saturation state while the magnetic core 44, located at the intersecting point of both coordinate leads $v_1$ and $u_1$, is subjected to the additive action of the individual currents $(1)_v$ and $(1)_u$ respectively. This current $(1)$ is in any case able to switch the core 44 into the state of positive saturation, which initiates the emission of a current designated by $(1)$ in FIG. 2, i.e. of the first portion of the output pulse through the winding $x_2$ and the sensing winding $x$. The effect of the output pulse in the winding $x_2$ tends to also switch the core 46, which is, however, prevented by the winding $-u_2$, carrying a current $(2)_{-u2}$ and, according to the invention, is effective in the same sense of direction.

In order to terminate the positive pulse, the core 46 must be switched. This occurs when corresponding currents of same direction $(2)_u$ and $(2)_v$ respectively, are sent through the coordinate leads $u_2$ and $v_2$. With the exception of the core 46 located at the intersection of the coordinate leads $u_2$ and $v_2$, all other cores linked by these leads remain in the state of negative saturation. The switching of the core 46 induces a negative pulse in the winding $x_2$, whereby the current already flowing is reduced to zero, so that the sensing lead $x$ is free of current. These phenomena will be readily followed up in FIG. 2, where the current pulse in the winding $x_1$ and $x_2$ has been given the reference characters $(1)$ and $(2)$ respectively, whereas the resulting pulse in the sensing winding $x$ is designated by $(\overline{X})$. The negative pulse in the sensing winding X begins when the currents $(1)_u$ and $(1)_v$ are cut out, and it terminates upon the cutting out of the currents $(2)_u$ and $(2)_v$, thereby insuring that the current in windings $-u_1$ and $-u_2$ switch the cores 44 and 46. It would be also possible however to switch the core 44 by means of the currents flowing through the coordinate leads $u_1$ and $v_1$ in a reverse direction, when, for instance, there is no pre-load winding $-u_1$.

The windings $-u_1$ and $-u_2$ respectively, can moreover result in the negative biasing of all unused driving cores.

Figure 4:
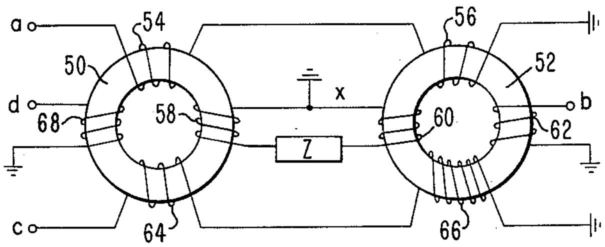
FIG. 4 is the wiring diagram of the device of the invention when used as a driving cell of a multicoordinate matrix.

FIG. 4 shows another embodiment of the invention. The load is in this case a multiple coordinate storage matrix in which magnetic core matrices occasionally provided with a distinct feeding are arranged in several storage planes. Each storage plane has then to be driven individually, for each plane contains information. The wiring diagram of FIG. 4 shows the application of the invention in connection with a storing device of the above type provided with several storage planes, whereby the double core driver shown merely plays the part of a sensing lead of a storage plane.

The magnetic cores of this example of application have been given the reference numerals 50 and 52. They carry primary windings 54 and 56 and secondary windings 58 and 60, respectively. In this embodiment the core 52 carries a winding 62. New in this embodiment are reset windings 64 and 66 respectively, located on the cores 50 and 52 respectively, as well as an additional winding 68 located on the core 50. The occasional sense of direction of the windings corresponds, as well as the circuits of the windings, to the arrangement shown in FIG. 1. Both windings 64 and 66, as well as the winding 68 operate in the same sense of direction, whereby the former are connected to a common circuit. The individual circuits are designated by *a*, *b*, *c*, *d* and *x*. In an illustrative embodiment, the windings 54, 58, 64 and 68 have the number of turns $n_3$, the windings 56, 60, 62 the number of turns $n_4$, and the winding 66 the number of turns $2n_4$. It is to be pointed out that the circuits *a* and *b* interlink all the pairs of driving cores of a storage coordinate, the circuit *d* interlinks all the pairs of driving cores belonging to a storage plane and that the circuit *c* interlinks the whole driving cores.

If a "1" is now to be read in, the cores 50 and 52 are, with the aid of the circuits *a* and *b*, in the same fashion as in the first illustrative embodiment, switched to the state of positive saturation, whereupon the circuit *d* is closed to switch the core 50 and generate a negative pulse in the storage coordinate lead *x*. The pulse of the circuit *d* effectively switches the core 50 only, whereas the other cores of the same matrix are driven towards the negative saturation.

Figure 5:
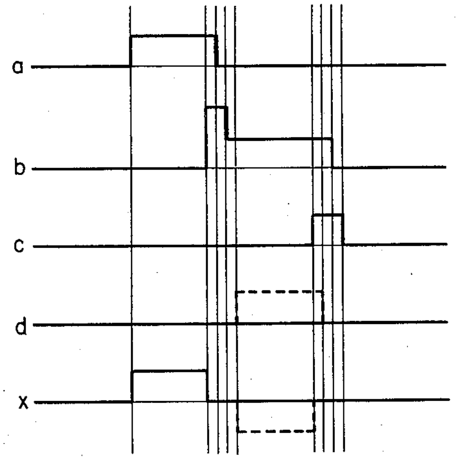
FIG. 5 shows the waveforms of individual output pulses obtainable with the device of FIG. 4 as well as the waveforms resulting from the cooperation of the individual output pulses.

The impulse of the circuit *d* and its effect on the shape of the output pulse is shown in dotted lines in FIG. 5. It is now obvious that the circuit *d* is not closed at all when a "0" is read in. In such a case, both cores 50 and 52 must be reset after the output pulse has terminated. This is achieved by closing the circuit *c*, whereby the eventually existing writing pulse becomes simultaneously terminated. The circuits *a* and *b* may themselves, when allowed by the remainder of the storage system, be supplied through a coordinate driver matrix in a same manner as already described in connection with FIG. 3.

In a double core driver according to the invention, the output current, besides the remanence of the magnetic cores and the number of turns of the windings, also depends upon the inductance of the load. The latter is in storage matrices subject to variations, whereas, the remanence of the magnetic core depends on the temperature. On the other hand, the output current, contrary to the conventional magnetic core drivers, is largely independent from the input current, so that for instance a considerable overswing and a fast damping of the input current, or the noisy and disturbing signals appearing in the same do not influence the output pulse. Likewise, the occurring of round waveshapes in the input current does not disturb the output pulse. The exciting pulses may thus be quite irregular without resulting thereby in any disturbances. The waveshape, shown in FIG. 5, of the circuit *b* could for instance exponentially damp. Additionally, the time expiration of the output pulse may vary within large limits under the influence of the termination of the input pulse. The rise and decay times of the output pulse are very short in the double core driver according to the invention and may in all cases be shorter than the corresponding times of the input pulse.

It results therefrom that the double core driver of the invention requires lesser cooling.

It is understood that the method of the invention is not restricted to the drivers of magnetic core storage matrices. On the contrary, it may advantageously be used whenever it is desirable to produce in an inductive load electric current pulses having a desired shape. Increasing the number of cores lies within the scope of the invention. One would moreover, as in the illustrative embodiments shown, connect the secondary windings in series with the load, in order to respectively send the output pulses, terminate them and act upon their amplitude. The arrangement of the other windings, their connection and interference would of course result in a suitable application of the inventive idea. A current generated through the switching of a core can be terminated through the resetting of the same core, or—as shown—with the aid of another core. Though it is contemplated to have the current change being produced by means of one core, the course of the current pulse may be in various ways accommodated to the requirements through a suitable cooperation of several cores.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirt of the invention. It is the intention therefore, to be limited only as indicated by the scope of the following claims.

What is claimed is:

1. A magnetic driver comprising, a first and a second bistable magnetic core, winding means including an output winding on each said core, said output windings serially connected with a load impedance, means for energizing said winding means to cause said first core to be switched from a first to a second stable state whereby an output signal is initiated to said load impedance, and said last named means including means terminating said output signal to said load by energizing said winding means to cause said second core to switch from said first to said second stable state.

2. A device as set forth in claim 1, wherein said output windings are oppositely wound.

3. A magnetic pulse shaping device comprising a first and a second bistable magnetic core, a primary and a secondary winding on each said cores, a control winding on said second core, circuit means connecting each said secondary winding with a load impedance, signal means initiating an induced output impulse to said load on said secondary winding of said first core by delivering a first signal to each said primary winding to switch said first core from a first to a second stable state and to bias said second core in said first stable state, signal means to terminate said output impulse by delivering a second signal to said control winding to switch said second core from said first to said second stable state, and signal means setting said cores in the first stable state by delivering a third signal to each of said primary windings.

4. A device as set forth in claim 3, wherein said secondary windings are wound in opposite sense and are serially connected.

5. A device as set forth in claim 3, wherein said primary windings are wound in opposite sense and are serially connected.

6. In a switching matrix for a memory system, a plurality of first bistable magnetic cores, a plurality of second bistable magnetic cores, one associated with each said first cores, each of said first and second cores being linked by a plurality of windings, one of said windings on each said core serially connected with said memory, means selectively energizing a first winding on a said first core to switch said first core from a first to a second stable state and to initiate an output signal to said memory, means terminating said output signal by energizing a second winding on a corresponding said second core to switch said second core to an opposite stable state, and means operable to reset each said core in said first stable state.

7. In a switching matrix as set forth in claim 6, wherein each of said cores are reset simultaneously.

References Cited in the file of this patent

UNITED STATES PATENTS

| | | |
|---|---|---|
| 2,734,185 | Warren | Feb. 7, 1956 |
| 2,776,419 | Rajchman | Jan. 1, 1957 |
| 2,781,504 | Canepa | Feb. 12, 1957 |
| 2,801,344 | Lubkin | July 30, 1958 |
| 2,913,596 | Ogle | Nov. 17, 1959 |